United States Patent
Hyakudai et al.

(10) Patent No.: US 6,720,824 B2
(45) Date of Patent: Apr. 13, 2004

(54) DEMODULATION METHOD AND APPARATUS

(75) Inventors: Toshihisa Hyakudai, Chiba (JP); Takahiro Okada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/901,731

(22) Filed: Jul. 10, 2001

(65) Prior Publication Data

US 2002/0017948 A1 Feb. 14, 2002

(30) Foreign Application Priority Data

Jul. 11, 2000 (JP) .................................... 2000-210331

(51) Int. Cl.⁷ ................................................ H03D 3/00
(52) U.S. Cl. ...................... 329/304; 375/324; 375/326
(58) Field of Search ................................ 329/304, 306, 329/307; 375/326, 327, 324.2

(56) References Cited

U.S. PATENT DOCUMENTS

| | | | | |
|---|---|---|---|---|
| 5,313,169 A | * | 5/1994 | Fouche et al. | |
| 5,825,241 A | * | 10/1998 | Beale et al. | |
| 6,028,900 A | * | 2/2000 | Taura et al. | |
| 6,584,092 B1 | * | 6/2003 | Sudo | |
| 6,594,320 B1 | * | 7/2003 | Sayeed | |

* cited by examiner

*Primary Examiner*—Robert Pascal
*Assistant Examiner*—Kimberly E Glenn
(74) *Attorney, Agent, or Firm*—Frommer Lawrence & Haug LLP; William S. Frommer; Gordon Kessler

(57) ABSTRACT

A demodulation method and apparatus applicable to e.g., digital broadcast in accordance with the orthogonal frequency division multiplexing system (OFDM), in which synchronization of carrier frequency correction control of OFDM signals can be maintained in stability. Based on the information indicating the demodulation reliability, such as the result of cumulative addition of CP values, supplied from the wide range fc error—CPE calculating circuit (10), or the transmission control signal detection information, supplied from the transmission control information demodulating communication (17), a holding circuit (14) verifies whether or not the wide range fc error—CPE calculating circuit (10) is making an erroneous detection operation. If the wide range fc error—CPE calculating circuit (10) is making an erroneous detection operation, the holding circuit (14) outputs the wide range fc error output in the previous symbol, without updating the information on the wide range fc error.

6 Claims, 12 Drawing Sheets

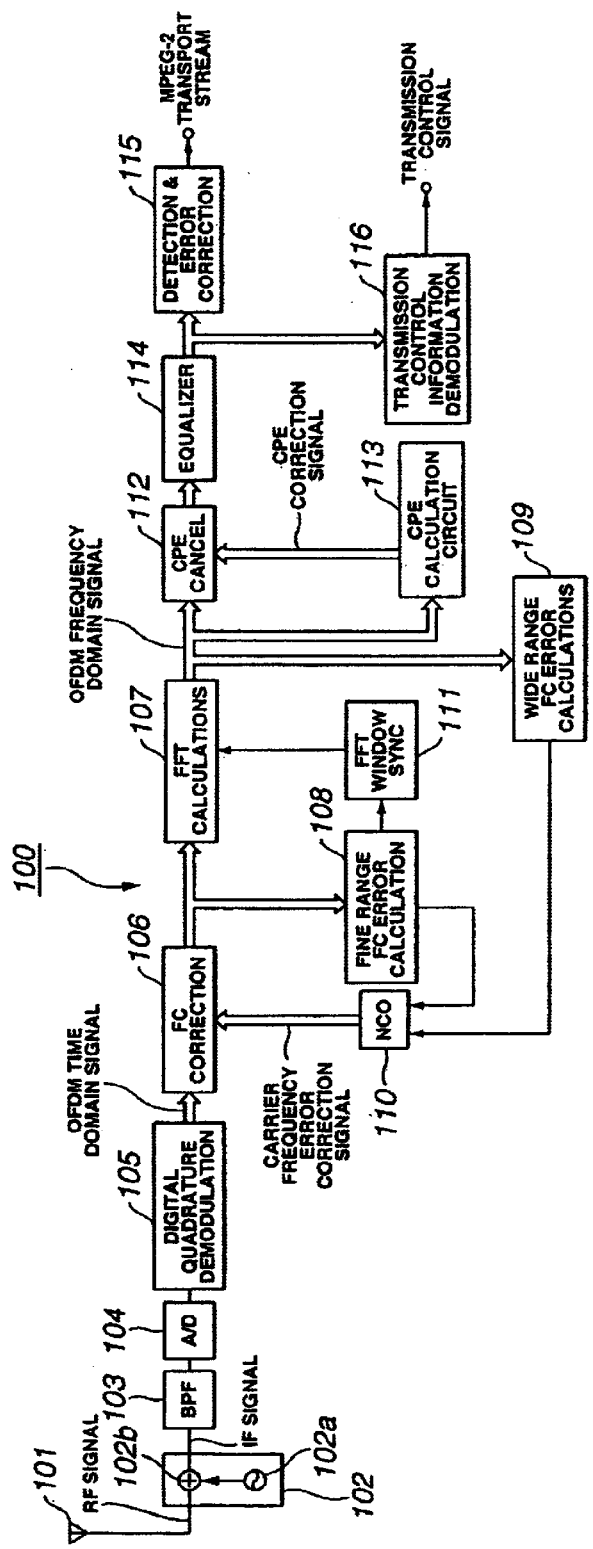
FIG.1
CONVENTIONAL

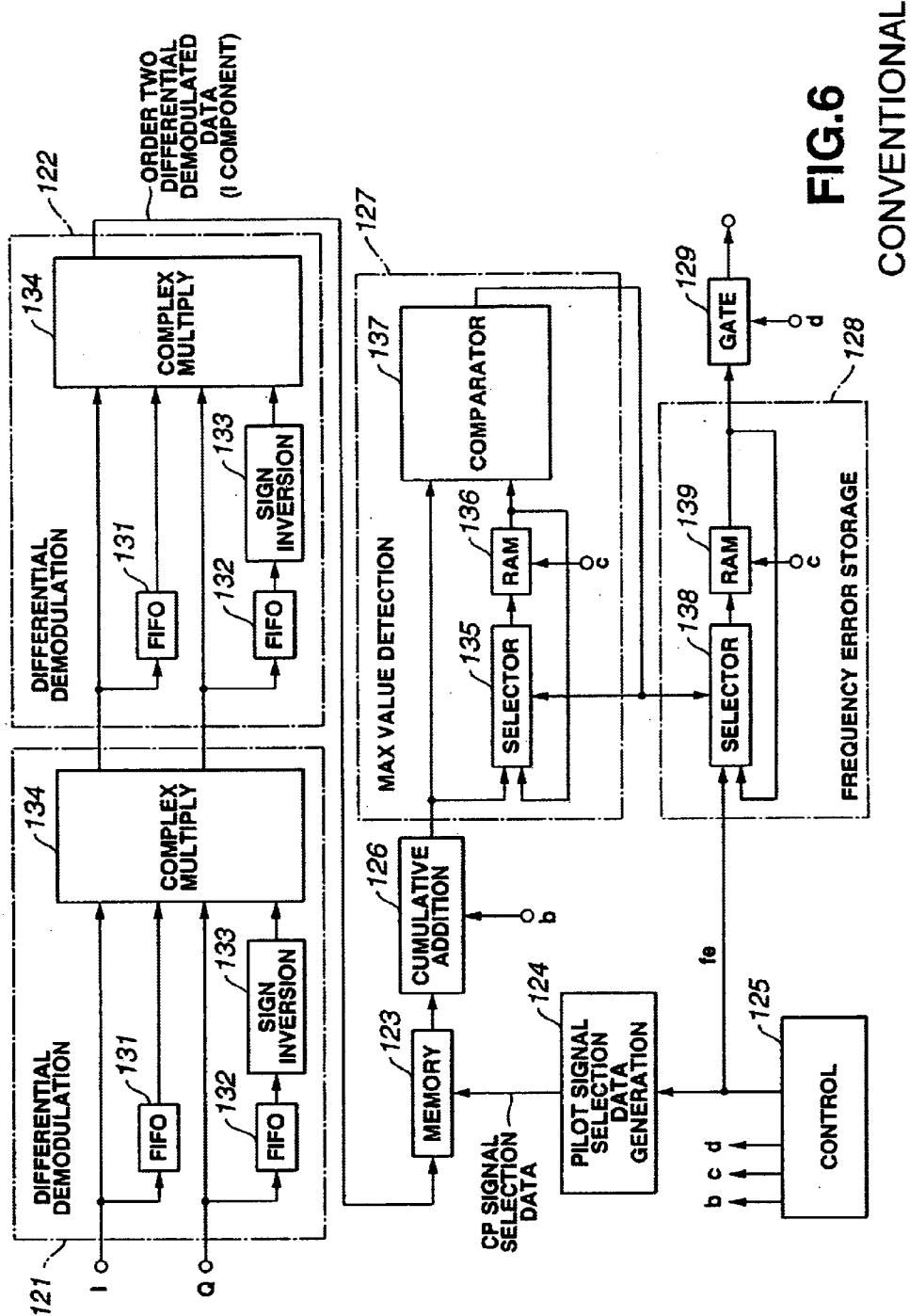
FIG.6
CONVENTIONAL

| | | | | | | | |
|---|---|---|---|---|---|---|---|
FIG.7A fe=−10Δf

| 2038 | 38 | | 749 | 755 | 770 | 794 | | 1673 | 1694 |

FIG.7B fe=−2Δf

| 2046 | 46 | | 757 | 763 | 778 | 802 | | 1681 | 1702 |

FIG.7C fe=−Δf

| 2047 | 47 | | 758 | 764 | 779 | 803 | | 1682 | 1703 |

FIG.7D fe=0

| 0 | 48 | | 759 | 765 | 780 | 804 | | 1683 | 1704 |

FIG.7E fe=Δf

| 1 | 49 | | 760 | 766 | 781 | 805 | | 1684 | 1705 |

FIG.7F fe=2Δf

| 2 | 50 | | 761 | 767 | 782 | 806 | | 1685 | 1706 |

FIG.7G fe=10Δf

| 10 | 58 | | 769 | 775 | 790 | 814 | | 1693 | 1714 |

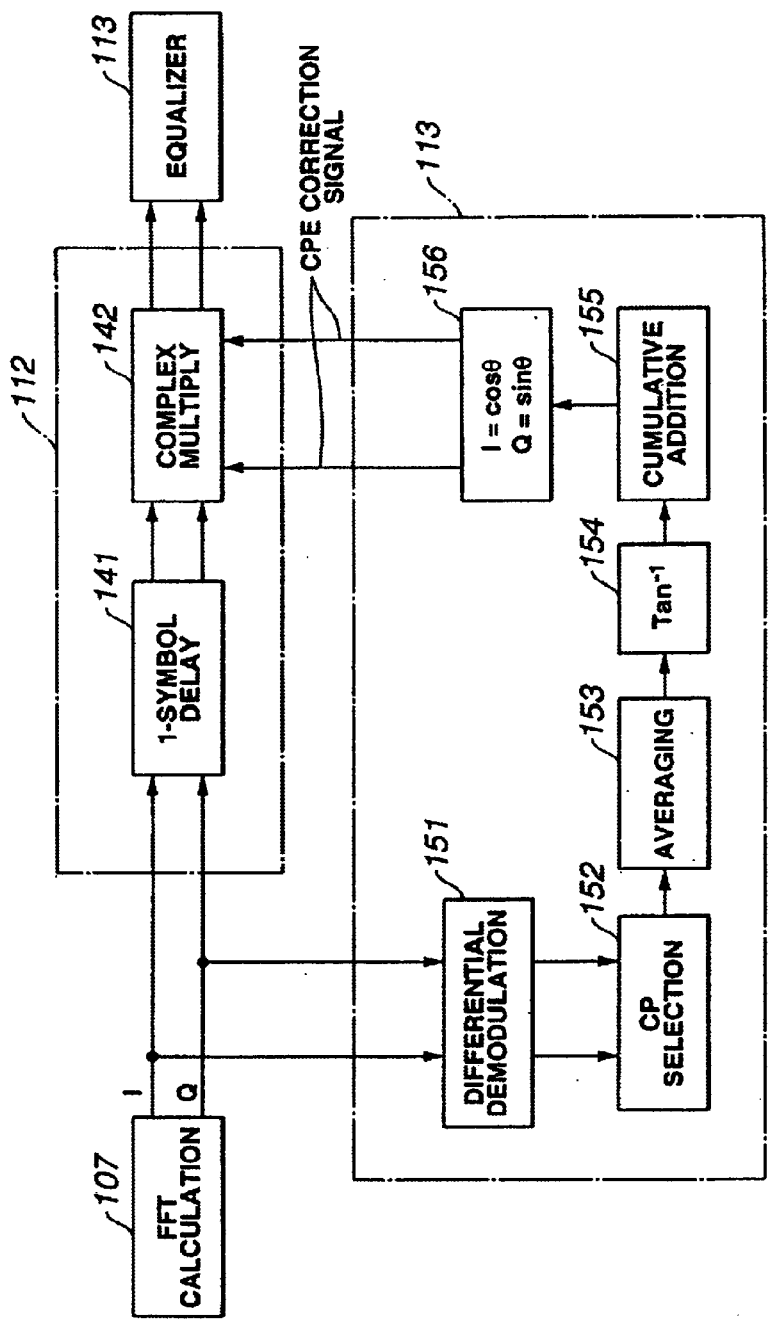
FIG.8
CONVENTIONAL

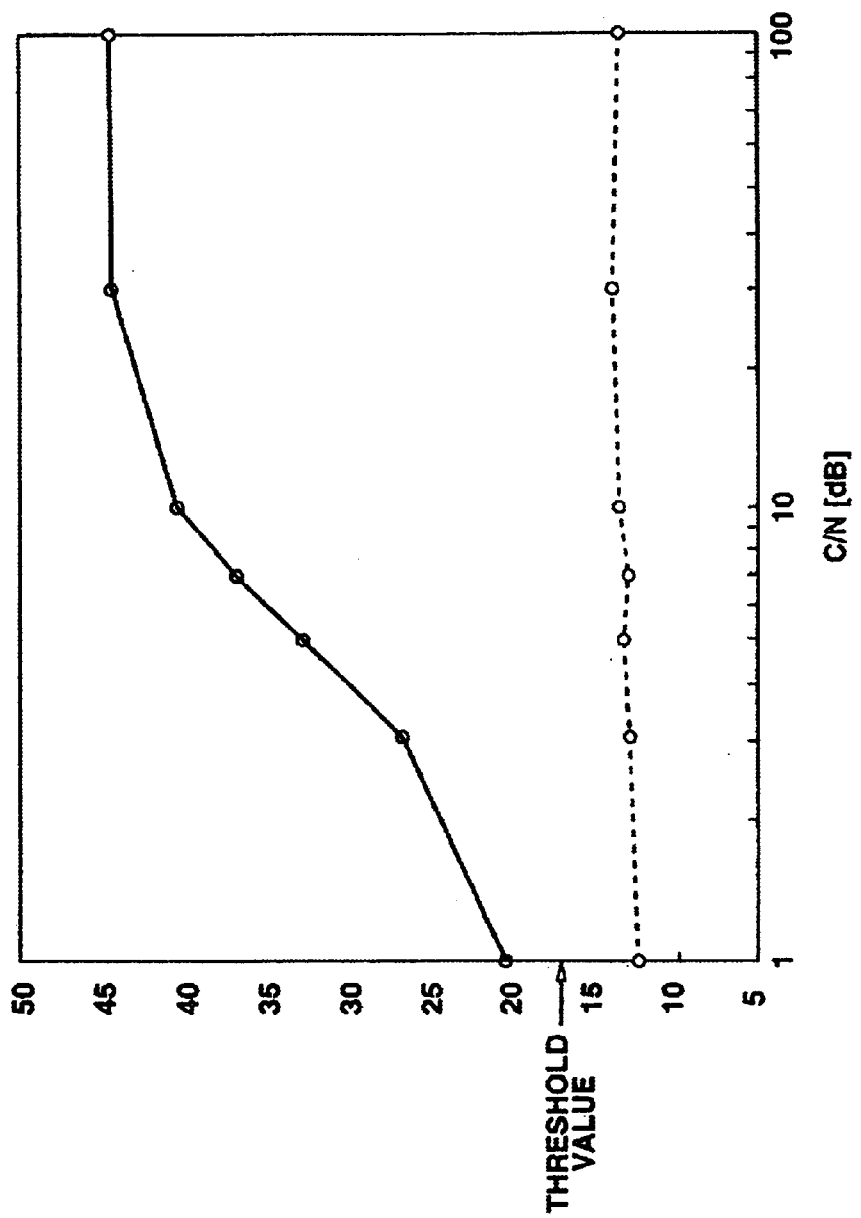

DEMODULATION METHOD AND APPARATUS

BACKGROUND OF THE INVENTION

1. Field of the Invention

This invention relates to a demodulation method and apparatus applicable to e.g., digital broadcast in accordance with the orthogonal frequency division multiplexing system (OFDM).

2. Description of Related Art

Recently, a modulation system, termed the orthogonal frequency division multiplexing system (OFDM), has been proposed as a system for transmitting digital signals. This OFDM system is such a system in which a large number of orthogonal sub-carriers are provided in a transmission band and data are assigned to the amplitudes and phases of the respective sub-carriers to effect digital modulation in accordance with the PSK (phase shift keying) or QAM (quadrature amplitude modulation).

This OFDM system has a feature that, although the band per sub-carrier is narrow to slow down the modulation rate due to the splitting of the transmission band with a large number of sub-carriers, the total transmission rate is unchanged from that in the conventional modulation system. Moreover, the OFDM system has a feature that the symbol rate is lowered due to parallel transmission of a large number of sub-carriers. Consequently, this OFDM system is less susceptible to multipath interference because the multipass time duration relative to the symbol time duration can be shorter. In addition, this OFDM system has a feature that, since data are assigned to plural sub-carriers, it is possible to construct a transmission/reception circuit by employing a calculation circuit performing inverse fast Fourier transform (IFFT) during modulation and also by employing fast Fourier transform (FFT) during demodulation.

In light of the above characteristics, the possibility of application of the OFDM system to terrestrial digital broadcast susceptible strongly to multipass interference is scrutinized extensively. For the terrestrial digital broadcast, to which is applied the OFDM system, such standards as DVB-T (Digital Video Broadcasting-Terrestrial) or ISDB-T (Digital Video Broadcasting-Terrestrial) or ISDB-T (Integrated Services Digital Broadcasting-Terrestrial) have been proposed.

The reception apparatus for digital television broadcast in accordance with the OFDM system is now explained. FIG. 1 is a block diagram showing a conventional OFDM reception apparatus.

In FIG. 1, if the signals transmitted between the blocks are complex or real number signals, signal components are expressed by thick and fine lines, respectively.

Referring to FIG. 1, a conventional OFDM reception apparatus 100 includes an antenna 101, a tuner 102, a bandpass filter (BPF) 103, an A/D converter 104, a digital quadrature demodulation circuit 105, an fc correction circuit 106, an FFT calculation circuit 107, a fine range fc error calculation circuit 108, a wide range fc error calculation circuit 109, a numerical control oscillator (NCO) 110, an FFT window synchronization circuit 111, a CPE cancellation circuit 112, a CPE calculating circuit 113, an equalizer 114, a detection error correction circuit 115 and a transmission control information demodulating circuit 116.

The digital television broadcast waves, aired from a broadcasting station, are received by the antenna 101 of the OFDM reception apparatus 100, and thence supplied as RF signals to the tuner 102.

The RF signals, received by the antenna 101, are frequency-converted into IF signals by the tuner 102, comprised of a local oscillator 102a and a multiplier 102b, and thence supplied to the BPF 103. The IF signals are filtered by the BPF 103 and digitized by the A/D converter 104 so as to be sent to the digital quadrature demodulation circuit 105.

The digital quadrature demodulation circuit 105 demodulates the digitized IF signals, using carrier signals of a pre-set frequency (carrier frequency or fc) to output baseband OFDM signals. The base-band OFDM signals, output by this digital quadrature demodulation circuit 105, are so-called time-domain signals prior to FFT calculations. So, the baseband signals prior to the FFT calculations following the digital quadrature demodulation are hereinafter called OFDM time domain signals. The OFDM time domain signals, quadrature demodulated, are complex signals comprised of real-axis components (I-channel signals) and imaginary-axis components (Q-channel signals). The OFDM time domain signals, output by the digital quadrature demodulation circuit 105, are sent to the fc correction circuit 106.

The fc correction circuit 106 executes complex multiplication of the carrier frequency error correction signal, output from the NCO 110, with the OFDM time domain signals, to correct the carrier frequency error of the OFDM time domain signals. The carrier frequency error is an error in the center frequency position of the OFDM time domain signals, produced due e.g., to the deviation in the reference frequency output from e.g., a local oscillator 102a. If this error is increased, an error rate of output data is increased. The OFDM time domain signals, corrected for carrier frequency errors, are fed to the FFT calculation circuit 107 and to the fine range fc error calculation circuit 108.

The FFT calculation circuit 107 performs FFT calculations on the OFDM time domain signals to extract data quadrature demodulated in each sub-carrier to output the extracted data. Output signals of the FFT calculation circuit 107 are so-called frequency domain signals following the FFT. So, the signal following the FFT calculations are referred to below as OFDM frequency domain signals.

Meanwhile, the OFDM time domain signals are transmitted in terms of an OFDM symbol as a unit of transmission, as shown in FIG. 2. This OFDM symbol is made up of an effective symbol, as a signal period during which IFFT occurs during transmission, and a guard interval during which the waveform of a latter portion of this effective symbol has been copied directly. This guard interval is provided in the former portion of the OFDM symbol. In the OFDM system, multipass durability is improved by provision of this guard interval. In the DVB-T standard (2K mode), for example, 2048 sub-carriers are contained in the effective period, with the sub-carrier interval being 4.464 kHz. It is in 1705 of the 2048 sub-carriers in the effective symbol that the data is modulated. The guard interval is the signal having one quarter time duration of the effective symbol. Meanwhile, in the OFDM reception apparatus, the OFDM symbol is quantized in accordance with the DVB-T standard (2K mode) by the A/D converter 104 using clocks sampling the effective symbol of the OFDM time domain signals and the guard interval with 2048 and 512 samples, respectively.

The FFT calculation circuit 107 extracts signals within the range of the effective symbol length, such as 2048 samples, from one OFDM sample, that is it eliminates the range of the guard interval from one OFDM symbol, and executes FFT calculations on the so-extracted 2048 samples of the OFDM time domain signals. Specifically, the position of starting the calculations is an optional position between the boundary of the OFDM symbol (position A of FIG. 1) and the end position of the guard interval (position B in FIG. 2), as shown in FIG. 2. This range of calculations is termed an FFT window.

Thus, similarly to the OFDM time domain signals, the OFDM frequency domain signals, output from the FFT calculation circuit 107, are complex signals comprised of real components (I-channel signals) and imaginary components (Q-channel components). The OFDM frequency domain signals are sent to the fc error calculation circuit 109, CPE cancellation circuit 112 and to the CPE calculating circuit 113.

The fine range fc error calculation circuit 108 and the wide range fc error calculation circuit 109 calculate the carrier frequency error contained in the OFDM time domain signals following digital quadrature demodulation by the digital quadrature demodulation circuit 105. Specifically, the fine range fc error calculation circuit 108 calculates the fine-range carrier frequency error to a precision not higher than ±½ of the sub-carrier frequency interval (4.464 kHz). The wide range fc error calculation circuit 109 calculates the wide range carrier frequency error to the precision of the sub-carrier frequency interval (such as 4.464 kHz). The carrier frequency errors, as found by the fine range fc error calculation circuit 108 and the wide range fc error calculation circuit 109, are sent to the NCO 110. The fine range fc error calculation circuit 108 and the wide range fc error calculation circuit 109 will be explained in detail subsequently.

The NCO 110 sums the fine-range carrier frequency error, calculated to a precision not higher than ±½ of the sub-carrier frequency interval by the fine range fc error calculation circuit 108, to the wide range carrier frequency error, calculated by the wide range fc error calculation circuit 109, to the precision of the sub-carrier frequency interval, to output carrier frequency error correction signals, the frequency of which is increased or decreased depending on the carrier frequency error resulting from the calculations The carrier frequency error correction signals are complex-multiplied with the OFDM time domain signals by the fc correction circuit 106, such that the carrier frequency error components of the OFDM time domain signals are eliminated.

Based on the OFDM symbol boundary position information, obtained when the fine range fc error calculation circuit 108 calculates the fine range carrier frequency error to the precision not higher than ±½ of the sub-carrier frequency interval, the FFT window synchronization circuit 111 finds the start timing of the FFT calculations by the FFT calculation circuit 107, to control the range of FFT calculation (FFT window). The method for detecting the OFDM symbol boundary position information will be explained in detail subsequently.

The CPE cancellation circuit 112 complex-multiplies the CPE correction signal, calculated by the CPE calculating circuit 113, with the OFDM frequency domain signals, to remove CPE (common phase error) contained in the OFDM frequency domain signals. This CPE is the noise caused by phase variations of the sub-carrier ascribable to the low range components of the phase noise. This noise is present in all of the sub-carriers with the same phase. The CPE is found by the CPE calculating circuit 113, and is supplied to the CPE cancellation circuit 112. The OFDM frequency domain signals, freed of the CPE by the CPE cancellation circuit 112, are sent to the equalizer 114. The method for detecting the CPE by the CPE calculating circuit 113 will be explained in detail subsequently.

The equalizer 115 equalizes the phase and the amplitude of the OFDM frequency domain signals, using e.g., scattered pilot signals (SP signals). The OFDM frequency domain signals, equalized in phase and amplitude, are sent to the detection error correction circuit 115.

The detection error correction circuit 115 detects the information modulated in each sub-carrier in accordance with the modulation system and decodes the data by e.g., demapping. The detection error correction circuit 115 then corrects the decoded data for errors to output e.g., an MPEG-2 transport stream.

The transmission control information demodulating circuit 116 demodulates the transmission control information modulated in pre-set sub-carrier positions; such as TMCC (transmission and multiplexing configuration control) or TPS (transmission parameter signalling). The transmission control information demodulated is supplied to e.g., a system controller, not shown, for use in controlling the demodulation or reproduction.

The operating principle of the fine range fc error calculation circuit 108 is hereinafter explained.

For the OFDM time domain signals, the fine range fc error calculation circuit 108 finds the correlation between the waveform of the guard interval and the waveform of the latter portion of the OFDM symbol, that is the signal waveform of the origin of copying of the guard interval, to find the boundary of the OFDM symbol based on this correlation.

Specifically, as shown in FIG. 3A, with the guard interval period of Tg (time) and with the effective symbol period of Tu (time), the autocorrelation function when the OFDM time domain signals f(t) have been translated along the time axis, with the integration domain being Tg, as shown by the following equation:

$$Corr(t) = \int f(t) f(t-Tu)^* dt$$

is found and the peak position of the autocorrelation function is set as the boundary of the OFDM symbol.

That is, the original OFDM time domain signals, shown in FIG. 3A, are translated by time Tu to find the translated OFDM time domain signals f(t+Tu), shown in FIG. 3B. Then, f(t) is multiplied with f(t+Tu), with the resulting function being then integrated with respect to time. The function resulting from the time integration is the autocorrelation function Corr(t). The highest peak portion of this autocorrelation function Corr(t) represents the highest correlation portion with respect to the guard interval. Consequently, the time indicated by the highest peak value of the autocorrelation function Corr(t), shown in FIG. 3C, denotes the time coincident with the waveform which proves the origination of copying of the guard interval. So, the time represents the boundary of the OFDM symbol.

The autocorrelation function Corr(t), thus found, is the complex signal, as indicated by the above equation, with its phase component being proportionate to the carrier frequency error. Therefore, this fine range fc error calculation circuit 108 finds the autocorrelation function in the boundary portion of the OFDM symbol and outputs the phase at this value of the autocorrelation function as the carrier frequency error. It is noted that, since the carrier frequency error as found from this autocorrelation function is repeated in a serrated fashion at an interval of the sub-carrier frequency, as shown in FIG. 4, the detection range is the information o the precision not higher than ±½ of the carrier frequency interval. The fine range carrier frequency error, thus found in the fine range fc error calculation circuit 108, is sent as the fine range carrier frequency error information to the NCO 110.

The peak position information, as calculated by this fine range fc error calculation circuit 108, represents the boundary of the OFDM symbol, as described above. The OFDM symbol boundary information, as found by the fine range fc error calculation circuit 108, is sent to the FFT window synchronization circuit 111 for use for FFT window synchronization.

The wide range fc error calculation circuit 109 is hereinafter explained.

First, the principle of calculating the carrier frequency error by the wide range fc error calculation circuit 109 is now explained.

In the OFDM signal, there are usually contained pilot signals called the continual pilots (CP) signals. These CP signals are signals perpetually representing specified phase and amplitude, and are inserted into the sub-carrier of plural indexes in the effective symbol. The number and the arraying pattern of the inserting positions of the CP signals contained in the effective symbol are determined in the standards. For example, in the case of the DVB-T standard (2K mode), 2048 (0 to 2047) sub-carriers are present in one effective symbol. In 45 of these sub-carriers are contained CP signals. In this DVB-T standard (2K mode), the arraying pattern of the CP signals in terms of the sub-carrier index numbers within the extent of 1705 sub-carriers in which the signals are modulated are 0, 48, 54, 87, 141, 156, 192, 201, 255, 279, 282, 333, 432, 450, 483, 525, 531, 618, 636, 714, 759, 765, 780, 804, 873, 888, 918, 939, 942, 969, 984, 1050, 1101, 1107, 1110, 1137, 1140, 1146, 1206, 1269, 1323, 1377, 1491, 1683 and 1704.

The wide range fc error calculation circuit 109 performs differential demodulation between temporally forward and backward symbols of the FFT calculated OFDM frequency domain signals to extract CP signals and calculates to which extent the sub-carrier positions of the CP signals extracted are shifted from the inherent sub-carrier signals to calculate the carrier frequency error of the OFDM signals.

The principle of extracting the CP signals by performing differential demodulation between symbols of the OFDM frequency domain signals twice is now explained with reference to FIG. 5.

FIG. 5 illustrates the phase transition between routine information data and the CP signals for illustrating the first-stage symbol-to-symbol differential demodulation and the second-stage symbol-to-symbol differential demodulation. It is assumed that, in FIG. 5, the information data are QPSK (quadrature phase shift keying) modulated data and that the information at specified amplitudes and phases are modulated in the CP signals.

FIG. 5A show the I-channel signals and the Q-channel signals, decomposed by FFT in terms of the frequency components of the sub-carriers as units, on the phase plane on the symbol basis, that is, for a (n−1)st symbol, nth symbol, (n+2)nd symbol, and so on. In FIG. 5A, an, bn represent information data for which index numbers of the sub-carriers following FFT of the nth OFDM symbol are a and b, respectively, while can, cbn represent the CP signals for which index numbers of the sub-carriers following FFT of the nth OFDM symbol are ca and cb, respectively.

Meanwhile, although the CP signals inherently own the constant amplitude and phase information, there are occasion where phase rotation occur to a more or less extent, from one symbol to another, under the effect of the reproducing carrier wave frequency error.

FIG. 5B shows the first differential demodulation data on the phase plane when the first symbol-to-symbol differential demodulation is taken of the information of the same index number, where dan, dbn represent the first differential demodulation data between the (n−1)st symbol and the nth symbol for which the index numbers of the sub-carriers are a and b, respectively. On the other hand, dcan, dcbn represent first differential demodulation data between the (n−1)st symbol and the nth symbol for which the index numbers of the sub-carriers are ca and cb, respectively.

FIG. 5C shows the second differential demodulation data on the phase plane when the symbol-to-symbol differential demodulation data has been taken of the information bearing the same index number. It is noted that dda, ddb denote second differential demodulation data obtained on differential demodulation between the result of differential demodulation of the (n−1)st symbol and the nth symbol for which the sub-carrier index numbers are a, b, respectively, and the result of differential demodulation of the nth symbol and the (n+1)st symbol for which the sub-carrier index numbers are ca, cb, respectively.

Since the CP signals ca, cb are signals of the pre-set phase, the FFT window phase error and the carrier phase error are removed on the first differential demodulation, such that the phase errors dependent on the carrier frequency error, CPE and on the reproducing clock frequency error are left. Since none of these phase errors are time-dependent, these errors are constant from one differential demodulation data to another. So, the second differential demodulation is executed between the data from the first differential demodulation, it is possible to eliminate the phase errors dependent on the CPE and the reproduction clock frequency left in the first differential demodulation. The result is that the CP signals converge to a certain positive value on the I-axis (see FIG. 5C).

On the other hand, the information data a, b assume random phases between symbols, so that, even after the second differential demodulation, the phase is random from data to data, as a result of which the data are randomly distributed on the I axis.

Therefore, if only I-axis data of the CP signals are cumulatively summed in one symbol, these CP signals are converged on a certain value on the I-axis, so that the signals are appreciably larger than the result of cumulative addition of the I-axis data corresponding only to the extracted information data. Thus, the sub-carrier signal of the CP signal can be estimated from the maximum value of the cumulative addition. By calculating to which extent the estimated CP signal sub-carrier position is shifted from the inherent sub-carrier arraying position, the carrier frequency error can be calculated to the precision of the sub-carrier interval.

A specified illustrative circuit of the wide range fc error calculation circuit 109 is now explained.

FIG. 6 shows a block diagram of the wide range fc error calculation circuit 109.

The wide range fc error calculation circuit 109 includes a first differential demodulation circuit 121, a second differential demodulation circuit 122, a memory 123, a pilot signal selection data generating circuit 124, a control circuit 125, a cumulative addition circuit 126, a maximum value detection circuit 127, a carrier frequency error storage circuit 128 and a gate circuit 129.

The first differential demodulation circuit 121 and the second differential demodulation circuit 122 are each comprised of first and second first-in-first-out memories (FIFOs) 131, 132, a sign inverter 133 and a complex multiplication circuit 134.

The first differential demodulation circuit 121 is fed with OFDM frequency domain signals (I- and Q-channel signals) from the FFT calculation circuit 107. The first and second FIFOs 131, 132 are supplied with I-channel signals and with Q-channel signals, respectively. The first and second FIFOs 131, 132 are each of memory capacities large enough to hold one effective symbol of the OFDM frequency domain signals of the I- and Q-channel signals supplied, and delays the I- and Q-channel signals supplied by one effective symbol. The sign inverter 133 inverts the sign of the Q-channel signals delayed by the second FIFO 132. The complex multiplication circuit 134 is fed with OFDM frequency domain signals (I- and Q-channel signals) output from the and with FFT calculation circuit 107 and with OFDM frequency domain signals (I- and Q-channel signals) delayed by one effective symbol by the first and second FIFOs 131, 132. The complex multiplication circuit 134 complex-multiplies the non-delayed OFDM frequency domain signals with the delayed OFDM frequency domain signals by way of differential demodulation to find the first differential demodulation data between symbols of the OFDM frequency domain signals. Specifically, with the non-delayed I—and Q-channel signals I, Q and with the delayed I- and Q-channel signals $I^{-1}$, $Q^{-1}$, the first differential demodulation circuit 121 executes the following complex calculations:

$$(I+jQ)(I^{-1}-jQ^{-1})$$

and divides the results of calculations into a real number component and an imaginary number component which are output to the second differential demodulation circuit 122.

The second differential demodulation circuit 122 is of the same configuration as the first differential demodulation circuit 121 and executes second differential demodulation on the first differential demodulation data between symbols output from the first differential demodulation circuit 121 to find the second differential demodulation data between the symbols. Meanwhile, the second differential demodulation circuit 122 outputs only the I-axis components (real-number component) of the result of the complex multiplication. The second differential demodulation circuit 122 sends the result of the second differential demodulation between the symbols to the memory 123.

The memory 123 stores the second differential demodulation data for one symbol, between the symbols, output from the second differential demodulation circuit 122, in e.g., the sequence of the sub-carrier index numbers in accordance with the readout address sent from the pilot signal selection data generating circuit 124, the memory 123 sends only the data specified by the readout address, among the data stored therein, to the cumulative addition circuit 126.

The pilot signal selection data generating circuit 124 generates the address information for specifying CP signals, among the second differential demodulation data (I-component) stored in the memory 123. Specifically, the pilot signal selection data generating circuit 124 holds a set of data of the index numbers for specifying the arraying positions of the plural sub-carriers in which the CP signals are modulated, such as 45 sub-carriers, among plural sub-carriers making up one effective symbol, such as 2048 sub-carriers, and generates the data set of the index numbers as readout addresses for the memory 123. The data specified as the readout address are supplied to the cumulative addition circuit 126. Specifically, the 45 data specified by the readout addresses are read out from the memory 123 and sent to the cumulative addition circuit 126. The data set specifying the index numbers of the CP signals supplied to the memory 123 as the readout addresses is termed the CP signal selection data. The pilot signal selection data generating circuit 124 is responsive to the shift value fe supplied from the control circuit 125 to shift the CP signal selection data, that is unanimously adds or subtracts a pre-set value to or from each value forming the CP signal selection data to impart readout addresses to the memory 123 plural times to readout data plural times from the memory 123.

Referring to FIGS. 7A to 7G, typical data of the CP signal selection data, generated by the pilot signal selection data generating circuit 124, are hereinafter explained. Although the shift value fe=−10 to +10 is sent from the control circuit 125 for detailed explanation, any suitable number may be used for the shift value fe. When the shift value fe=0 is supplied from the control circuit 125, the pilot signal selection data generating circuit 124 generates CP signal selection data shown in FIG. 7D to send the generated data to the memory 123. The CP signal selection data, generated for the shift value fe=0, is a set of data indicating the index number of the sub-carrier in which are modulated the inherent CP signals prescribed in the standard.

When fed with the shift value fe=Δf, the pilot signal selection data generating circuit 124 generates CP signal selection data, shown in FIG. 7E, to route the generated data to the memory 123. The CP signal selection data, generated for the shift value fe=Δf, is a set of data corresponding to the totality of the index numbers of the sub-carrier, in which the inherent CP signals are modulated, plus 1. If the shift value fe=2Δf is supplied, the pilot signal selection data generating circuit 124 generates a data set corresponding to the totality of the index numbers of the sub-carriers, in which the inherent CP signals are modulated, plus the 2. In similar manner, if the shift value fe=3Δf to 9Δf are supplied, the pilot signal selection data generating circuit 124 generates a data set corresponding to the totality of the index numbers of the sub-carriers, in which the inherent CP signals are modulated, plus the shift value Δf, whereas, if the shift value fe=10Δf is supplied, the pilot signal selection data generating circuit 124 generates a data set corresponding to the totality of the index numbers of the sub-carrier, in which the inherent CP signals are modulated, plus 10, as shown in FIG. 7G, On the other hand, if a minus shift value fe=−Δf is supplied, the pilot signal selection data generating circuit 124 generates a set of data corresponding to the totality of the index numbers of the sub-carriers in which are modulated the inherent CP signals shown in FIGS. 7A to 7C, less the shift value Δf. Meanwhile, if the value of the index number is 1 or less, the value reverts to 2047, such as to cyclically repeat the index numbers of 0 to 2047 of the sub-carriers of the effective symbol.

21 patterns of the CP signal selection data, supplied as readout addresses to the memory 123, as shown for example in FIG. 7, are sequentially generated until updating of the second differential demodulation data stored in the memory 123. That is; during one symbol period, shift values of from −10Δf to 10Δf are sequentially supplied to the pilot signal selection data generating circuit 124, as a result of which 45 data corresponding to the respective shift values fe are sent sequentially 21 times to the cumulative addition circuit 126.

The cumulative addition circuit 126 is fed with plural second differential demodulation data selected by the CP signal selection data so that these second differential demodulation data are cumulatively summed together. That is, the cumulative addition circuit 126 is reset in synchronism with the timing when the CP signal selection data is supplied to the memory 123. That is, if 21 patterns of the CP signal selection data shown in FIGS. 7A to 7G are supplied during one symbol period, the cumulative addition circuit 126 is reset each time the second differential demodulation data as selected for each pattern is supplied. Therefore, the cumulative addition circuit 126 sequentially outputs e.g., the 21 results of the cumulative addition one by one during each symbol period. The results output from the cumulative addition circuit 126 are sent to the maximum value detection circuit 127.

This maximum value detection circuit 127 includes a selector 135, a RAM 136 and a comparator circuit 137 and, of e.g., 21 results of the cumulative addition, output from the cumulative addition circuit 126, selects the maximum result of the cumulative addition, and outputs an enabling signal at a timing of selection of the maximum result of the cumulative addition. Specifically, the comparator circuit 137 compares the value stored in the RAM 136 to the result of the cumulative addition, output from the cumulative addition circuit 126. If the result of the cumulative addition, output from the cumulative addition circuit 126 is larger than the value stored in the RAM 136, the comparator circuit 137 outputs an enabling signal, which is supplied to the selector 135. The selector 135, thus fed with the enabling signal, stores the result of the cumulative addition in the RAM 136. Thus, of e.g., the 21 results of the cumulative addition, output from the cumulative addition circuit 126, the maximum result of the cumulative addition is stored in the RAM 136. On the other hand, the enabling signal output from the comparator circuit 137 when the maximum result of the cumulative addition of e.g., the 21 results of the cumulative addition is selected represents the last enabling signal occurrence timing (the last occurrence timing in one symbol period). Meanwhile, the inner data in the RAM 136 in the maximum value detection circuit 127 is cleared each symbol period (at a timing of updating of the second differential demodulation data in the memory 123).

The carrier frequency error storage circuit 128 is made up of a selector 138, and a RAM 139 in which to store data as selected by the selector 128. The selector 128 is fed with the shift value fe, supplied from the control circuit 125 to the pilot signal selection data generating circuit 124, in timed relation to the supply thereof to the pilot signal selection data generating circuit 124. Simultaneously, an output of the RAM 139, connected on the downstream side, is fed back to the selector. The selector 135 operates in accordance with the enabling signal output from the comparator circuit 137 of the maximum value detection circuit 127. Specifically, the shift value fe supplied from the control circuit 138 is fed to the RAM 139 if the enabling signal is supplied, whereas, if the enabling signal is not supplied, the shift value fe fed back from the RAM 139 is stored in the RAM 139. So, the shift value fe of the CP signal selection data, which gives the maximum value of the result of the cumulative addition of the CP signal, is stored in the RAM 13.

Then, the gate circuit 129 latches the shift value fe stored in the RAM 139, at a timing of one symbol period, to output the latched value as a carrier error value each sub-carrier interval.

By the above-described processing, the wide range fc error calculation circuit 109 extracts plural CP signals contained in the effective symbol of the OFDM frequency domain signals following FFT calculations to calculate to which extent the position of the sub-carrier of the CP signal subtracted is shifted from the inherent sub-carrier position, to calculate the carrier frequency error to the accuracy of the sub-carrier interval.

Referring to FIG. 8, the CPE cancellation circuit 112 and the CPE calculating circuit 113 are explained in detail.

In FIG. 8, the CPE cancellation circuit 112 includes a one-symbol delay circuit 141 and a complex multiplication circuit 142. The CPE calculating circuit 113 includes a differential demodulation circuit 151, a CP selection circuit 152, an averaging circuit 153, a $\tan^{-1}$ circuit 154, a cumulative addition circuit 155 and a complex conversion circuit 156.

The differential demodulation circuit 151 finds symbol-to-symbol differential demodulation data for the OFDM frequency domain signals output from the FFT calculation circuit 107. The circuit configuration of the differential demodulation circuit 151 is the same as that of the first differential demodulation circuit 121 of the wide range fc error calculation circuit 109. The differential demodulation circuit 151 sends the symbol-to-symbol differential demodulation data calculated to the CP selection circuit 152.

The CP selection circuit 152 selects the first differential demodulation data of the CP signal component from among the first symbol-to-symbol differential demodulation data supplied. As aforesaid, a plurality of the CP signals are contained in pre-set positions of the plural sub-carrier in the effective symbol. For example, 45 CP signals are contained in each symbol in the DVB-T standard (2K mode). The CP selection circuit 152 stores the index of the sub-carrier in which the CP signals are modulated and extracts only the index data to select the CP signals. The first symbol-to-symbol differential demodulation data of the CP signal component are sent to the averaging circuit 153.

The averaging circuit 153 averages the first symbol-to-symbol differential demodulation data of the CP signals within one symbol. The averaging circuit 153 finds an average value in one symbol of the first differential demodulation data of, for example, 45 CP signals, to output the average value as phase variation in the symbol. The value of this phase variation is routed to the $\tan^{-1}$ circuit 154.

The $\tan^{-1}$ circuit 154 calculates an arctangent of the real number component and the imaginary number component of the phase variation supplied as complex signal to find angular data of the phase variation value. The angular data of the phase variation thus found is sent to the cumulative addition circuit 155.

The cumulative addition circuit 155 cumulatively adds the angular data supplied thereto. The cumulative addition circuit 155 cumulatively adds the phase variation components of the respective symbols to follow up with the phase variation of the OFDM signals. The angular data, thus cumulatively summed together, are sent to the complex conversion circuit 156.

The complex conversion circuit 156 converts the angular data into complex signals composed of real-number components (I-components) and the imaginary number components (Q-components). The phase variation values, converted into the complex numbers, are sent as the CPE correction signals to the complex multiplication circuit 142.

The OFDM frequency domain signals, output from the FFT calculation circuit 107, are delayed one symbol by the one-symbol delay circuit 141 of the CPE cancellation circuit 112 and thence supplied to the complex multiplication circuit 142. The one symbol delay is here introduced because the processing is delayed by one symbol by the differential demodulation executed when the CPE calculating circuit 113 finds the CPE correction signal.

The complex multiplication circuit 142 complex-multiplies the OFDM frequency domain signals, delayed by one symbol, with the phase variation supplied from the complex conversion circuit 156 of the CPE calculating circuit 113 to eliminate the CPE component contained in the OFDM frequency domain signals.

In the conventional OFDM reception apparatus described above, the CP signals are extracted from the frequency domain signals following the FFT calculations, and detects the wide range carrier frequency error from the shift value of the CP signal. Specifically, the symbol-to-symbol differential demodulation is executed twice on the complex data following FFT demodulation, by taking advantage of the fact that the phase component of the CP signal is zero, and such a signal which gives the zero result of detection of the two symbol-to-symbol differential demodulation is extracted as the CP signal.
70.

However, if the CP signal is attenuated due to the deterioration of the transmission channel or the reception state, the noise energy becomes larger than the CP signal energy, thus giving rise to a risk that signals other than the CP signals be erroneously detected as being CP signals. Should the signals other than the CP signals be detected erroneously as being CP signals, the carrier frequency error may be fluctuated to disengage the synchronization of the processing of correcting the carrier frequency.

SUMMARY OF THE INVENTION

It is therefore an object of the present invention to provide a demodulation method and apparatus whereby synchronization of the carrier frequency correction controlling operation of the OFDM signals can be maintained in stability.

In one aspect, the present invention provides a demodulating apparatus for demodulating orthogonal frequency division multiplexing (OFDM) signals, including carrier frequency correction means for complex multiplying the carrier frequency error correction signals with the OFDM signals to correct the carrier frequency of the OFDM signals, Fourier transform means for Fourier transforming the OFDM signals, the carrier frequency of which has been corrected by the carrier frequency correction means, every symbol period, to demodulate the information modulated in each sub-carrier to generate frequency domain signals, carrier frequency error calculating means for calculating the carrier frequency error of the OFDM signals based on the frequency domain signals demodulated by the Fourier transform means and/or on the OFDM signals corrected for the carrier frequency by the carrier frequency correction means, frequency error correction signal generating means for generating the frequency error correction signals based on the carrier frequency error calculated by the carrier frequency error calculating means to generate the frequency error correction signal, and holding means for finding the reliability of fluctuations in the carrier frequency error calculated by the carrier frequency error calculating means when the carrier frequency error calculated by the carrier frequency error calculating means is fluctuated, the holding means holding the carrier frequency error output from the carrier frequency error calculating means at a value prior to the fluctuations if the reliability is low.

If, in the present demodulating apparatus, the carrier frequency error is fluctuated, the reliability of the fluctuations is found and, if the reliability is found to be low, the carrier frequency error output from the carrier frequency error calculating means is held at a pre-fluctuation value.

In another aspect, the present invention provides a demodulating method for demodulating orthogonal frequency division multiplexing (OFDM) signals, including the steps of Fourier transforming the OFDM signals every symbol period to demodulate the information modulated in each sub-carrier to generate frequency domain signals, calculating the carrier frequency error of the OFDM signals based on the frequency domain signals and/or the OFDM signals, generating a signal for correcting the frequency error based on the carrier frequency error of the OFDM signals calculated, complex-multiplying the carrier frequency error correction signal with the OFDM signals to correct the carrier frequency of the OFDM signals and finding the reliability of fluctuations in the calculated carrier frequency error in case such fluctuations occur; and holding the carrier frequency error at a pre-fluctuation value if the reliability is low.

If, in the present demodulating method, the carrier frequency error is fluctuated, the reliability of the fluctuations is found and, if the reliability is found to be low, the carrier frequency error is held at a pre-fluctuation value.

According to the demodulating method and apparatus of the present invention, if the carrier frequency error is fluctuated, the reliability of the fluctuations is checked. If the reliability is found to be low, the carrier frequency error output from the carrier frequency error calculating means is held at a value prior to the fluctuations. Thus, if the correct carrier frequency error is difficult to detect due to noise of fading, the synchronization of the carrier frequency correction control operation of the OFDM signals may be maintained in stability to prevent the malfunction from occurring.

BRIEF DESCRIPTION OF THE DRAWINGS

FIG. 1 is a block diagram showing a conventional OFDM reception apparatus.

FIG. 6 is a block diagram of a wide range carrier frequency error calculation circuit of the conventional OFDM reception apparatus.

FIGS. 7A to 7G illustrates exemplary data of the CP signal selection data generated by a pilot signal selection data generating circuit of the conventional OFDM reception apparatus.

FIG. 8 is a block diagram of a CPE error calculation circuit of the conventional OFDM reception apparatus.

FIG. 12 is a graph showing the experimental results for comparing the result of cumulative addition of differential demodulation of the totality of the CP signals in a symbol twice and cumulative addition of differential demodulation of 45 information data other than the CP signals.

DESCRIPTION OF THE PREFERRED EMBODIMENTS

A digital broadcast reception apparatus by the OFDM system (OFDM reception apparatus) according to the present invention is explained in detail.

Figure 2:
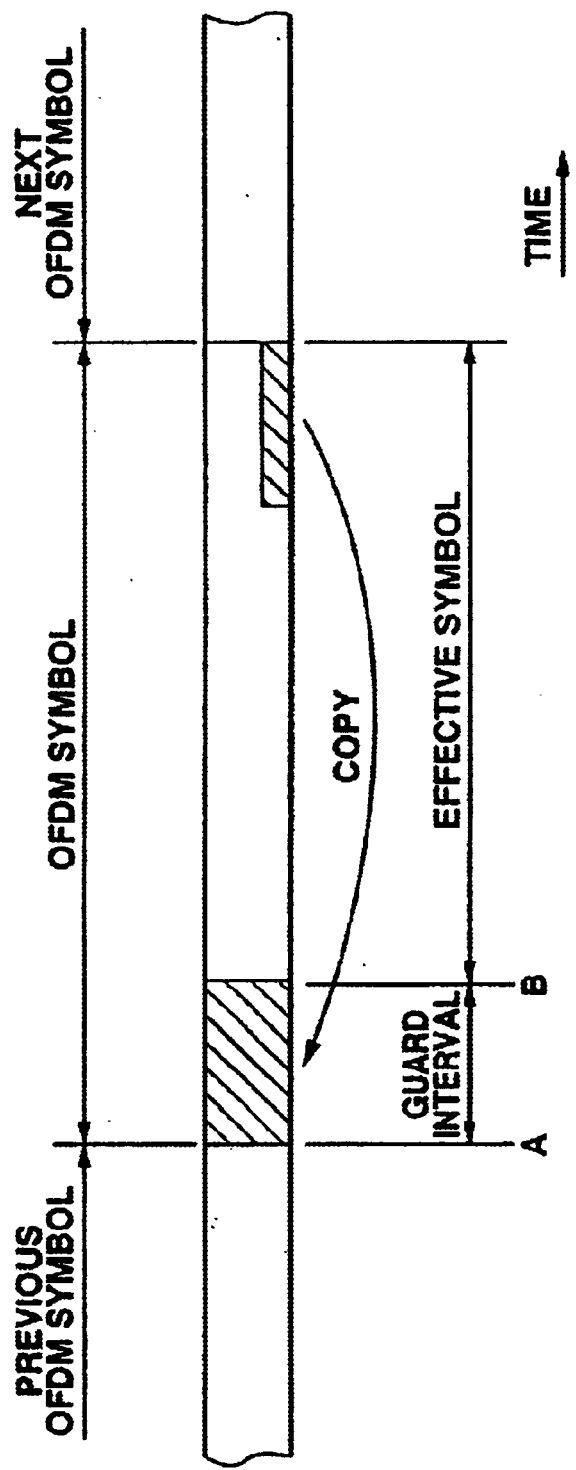
FIG. 2 illustrates a guard interval of OFDM signals.
Figure 3:
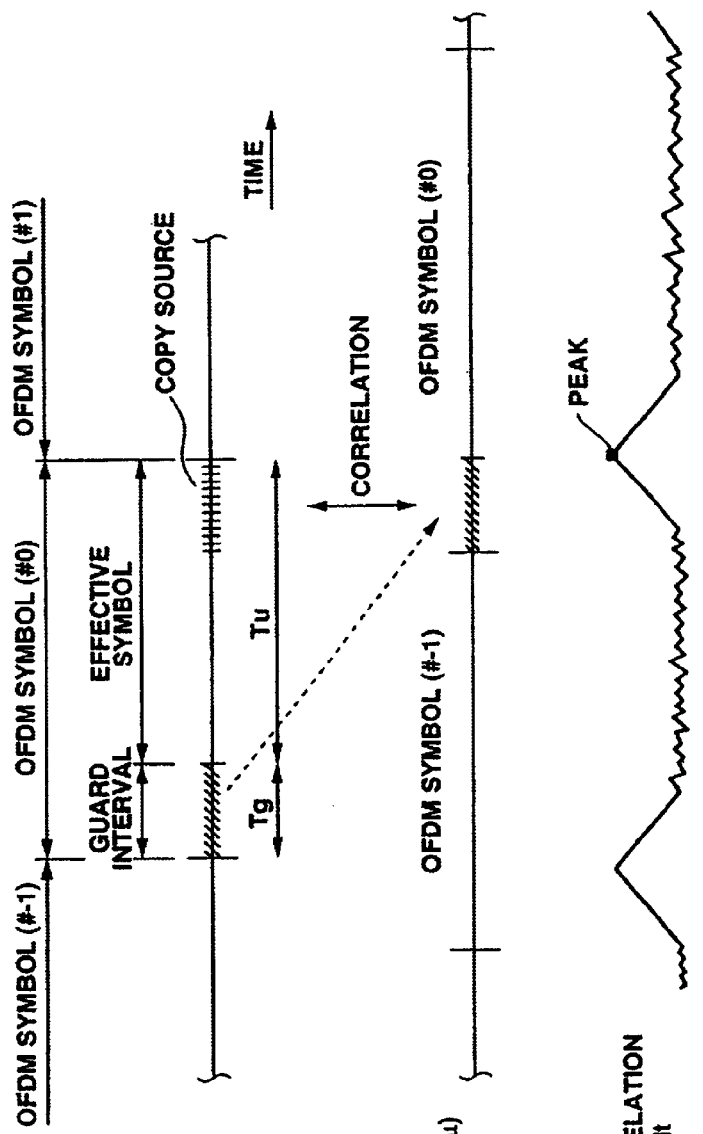
FIGS. 3A to 3C illustrates that the boundary of the OFDM symbol can be found from the autocorrelation function on translating the OFDM time domain signals
Figure 4:
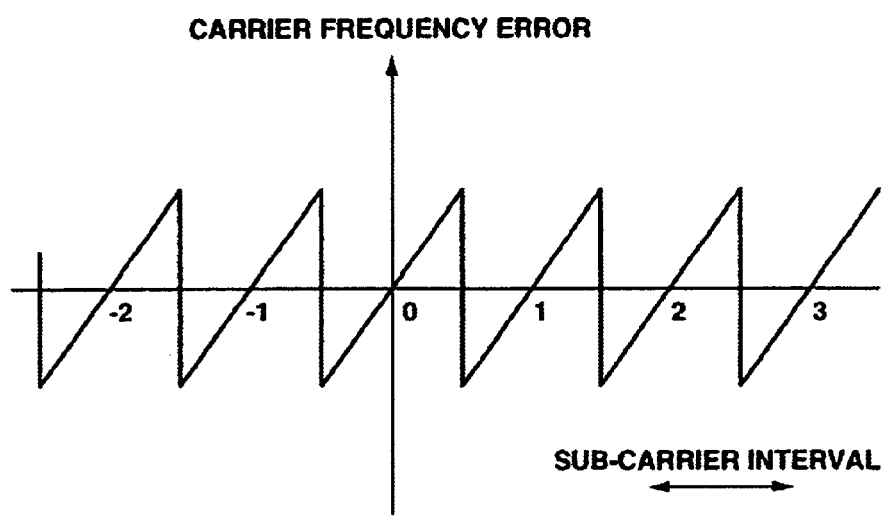
FIG. 4 illustrates the fine range carrier frequency error.
Figure 5:
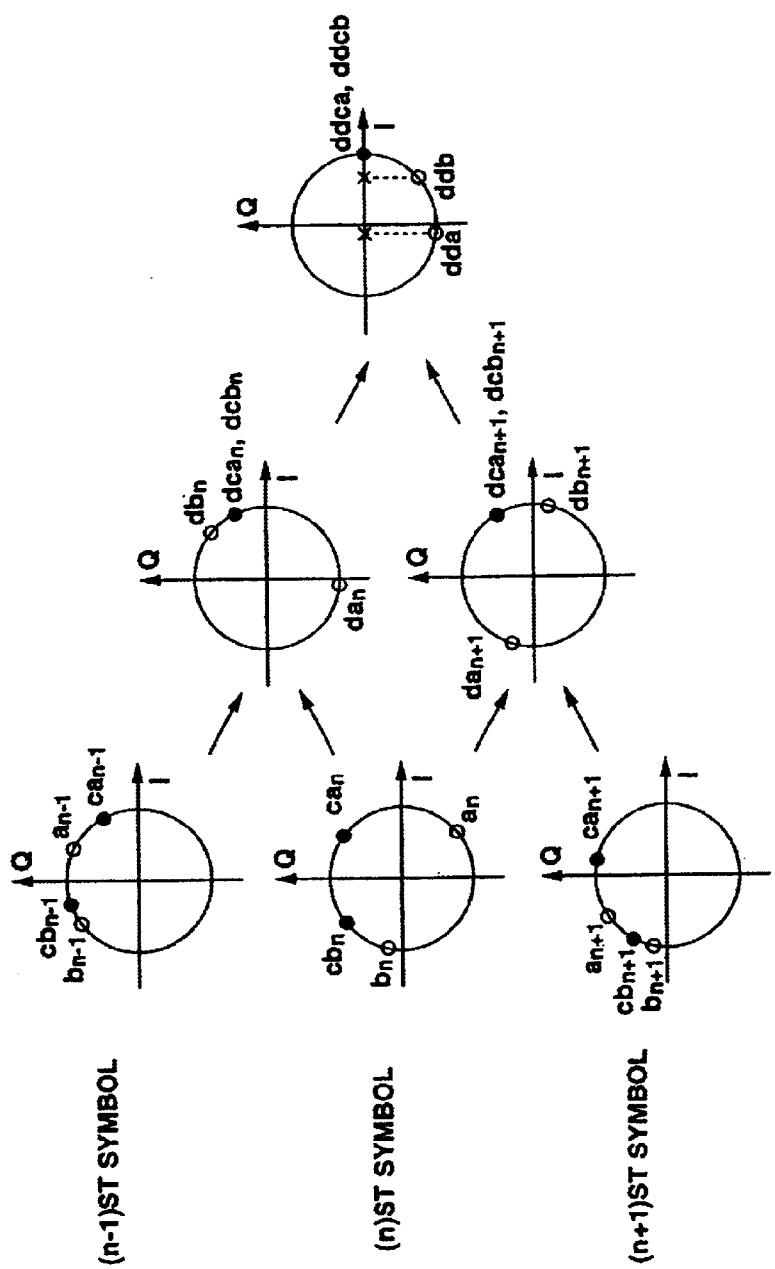
FIGS. 5A to 5C illustrates the principle that the CP signal can be extracted by performing symbol-to-symbol differential demodulation twice on the OFDM time domain signals.
Figure 9:
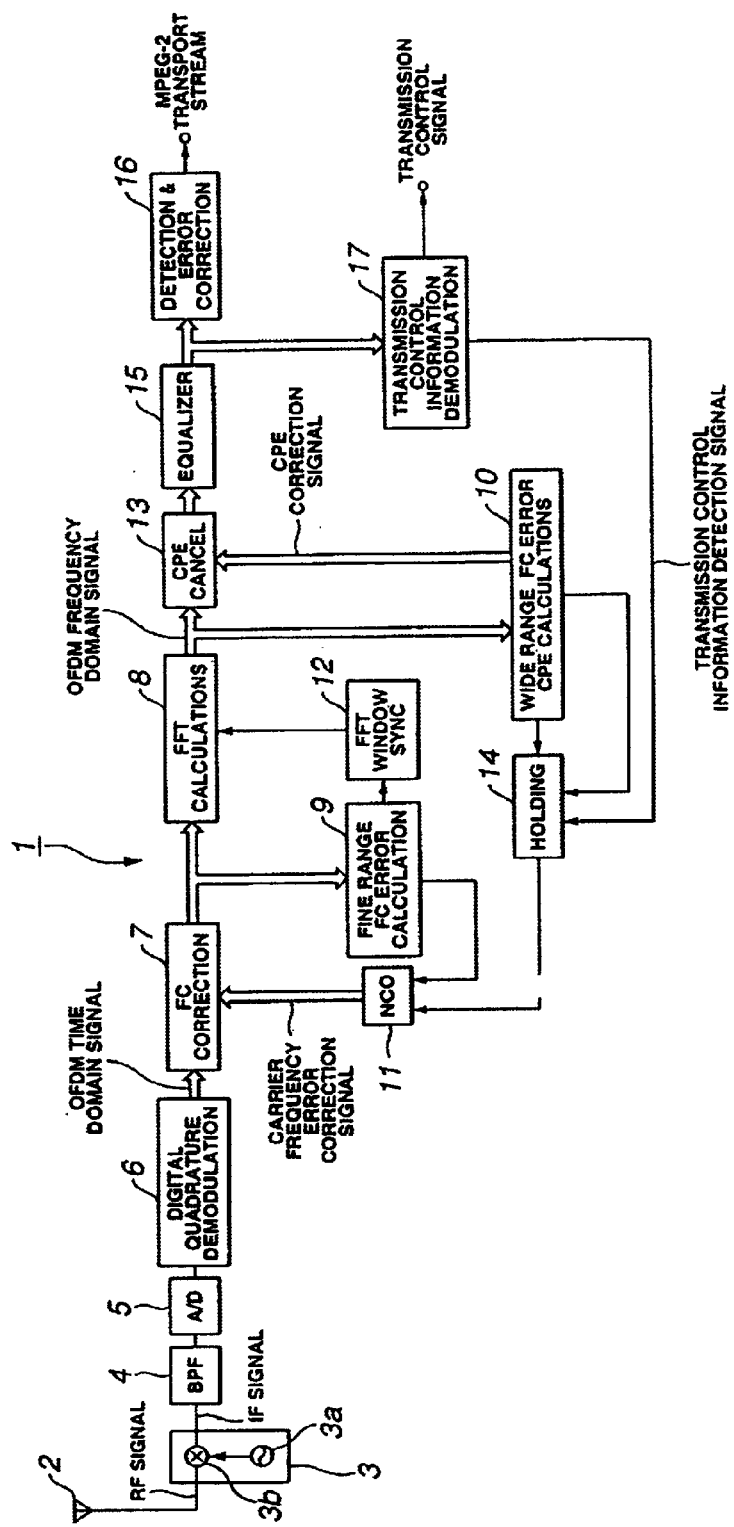
FIG. 9 is a block diagram showing an OFDM reception apparatus embodying the present invention.

FIG. 9 shows a block diagram of an OFDM reception apparatus embodying the present invention. In FIG. 9, if the signals transmitted between the blocks are complex or real number signals, signal components are expressed by thick and fine lines, respectively.

Referring to FIG. 9, an OFDM reception apparatus 1 includes an antenna 2, a tuner 3, a bandpass filter (BPF) 4, an A/D converter 5, a digital quadrature demodulation circuit 6, an fc correction circuit 7, an FFT calculation circuit 8, a fine range fc error calculation circuit 9, a wide range fc error-CPE calculation circuit 10, a numerical control oscillator (NCO) 11, an FFT window synchronization circuit 12, a CPE cancellation circuit 13, a holding circuit 14, an equalizer 15, a detection error correction circuit 16 and a transmission control information demodulating circuit 17.

The digital television broadcast waves, aired from a broadcasting station, are received by the antenna 2 of the OFDM reception apparatus 1, and then supplied as RF signals to the tuner 3.

The RF signals, received by the antenna 2, are frequency-converted into IF signals by the tuner 3, comprised of a local oscillator 3a and a multiplier 3b, and thence supplied to the BPF 4. The IF signals are filtered by the BPF 4 and digitized by the A/D converter 5 so as to be sent to the digital quadrature demodulation circuit 6. The A/D converter 5 performs sampling with clocks which, in e.g., the DVB-T standard, enables the effective symbol to be sampled in 2048 samples, that is enables 10 OFDM samples to be sampled in 2560 (2048+512) samples.

The digital quadrature demodulation circuit 6 quadrature-demodulates the digitized IF signals, using carrier signals of a pre-set frequency (carrier frequency or fc) to output base-band OFDM signals. The base-band OFDM signals, output by this digital quadrature demodulation circuit 6, are so-called time-domain signals prior to FFT calculations. So, the baseband signals prior to the FFT calculations following the digital quadrature demodulation are hereinafter called OFDM time domain signals. The OFDM time domain signals, quadrature demodulated, are complex signals comprised of real-axis components (I-channel signals) and imaginary-axis components (Q-channel signals). The OFDM time domain signals, output by the digital quadrature demodulation circuit 6, are sent to the fc correction circuit 7.

The fc correction circuit 7 executes complex multiplication of the carrier frequency error correction signal, output from the NCO 11, with the OFDM time domain signals, to correct the carrier frequency error of the OFDM time domain signals. The carrier frequency error is an error in the center frequency position of the OFDM time domain signals, produced due e.g., to the deviation in the reference frequency output from e.g., a local oscillator 3a. If this error is increased, an error rate of output data is increased. The OFDM time domain signals, corrected for carrier frequency errors, are fed to the FFT calculation circuit 8 and to the fine range fc error calculation circuit 9.

The FFT calculation circuit 8 performs FFT calculations on the OFDM time domain signals to extract data quadrature demodulated in each sub-carrier to output the extracted data. Output signals of the FFT calculation circuit 8 are so-called frequency domain signals following the FFT. Accordingly, the signal following the FFT calculations are referred to below as OFDM frequency domain signals The FFT calculation circuit 8 performs FFT calculations on a range of the effective symbol length (range of 2048 samples) obtained on eliminating the signals of the time length of the guard interval from the OFDM symbol. This range of the calculations (FFT window) is controlled by the FFT window synchronization circuit 12. Specifically, the position of starting the calculations is anywhere from the boundary of the OFDM symbol to the guard interval end position.

Similarly to the OFDM time domain signals, the OFDM time domain signals, output from the FFT calculation circuit 8, are complex signals made up of real-axis components (I-channel signals) and real-axis components (I-channel signals). The OFDM time domain signals are routed to a wide range fc error—CPE calculation circuit 10 and to the CPE cancellation circuit 13.

The fine range fc error calculation circuit 9 calculates the fine range carrier frequency error contained in the OFDM time domain signals following digital quadrature demodulation by the digital quadrature demodulation circuit 6. Specifically, the fine range fc error calculation circuit 9 calculates the carrier frequency error to the precision of not higher than ±½ of the sub-carrier frequency interval of, for example, 4.464 kHz. The fine range carrier frequency error, as found by the fine range fc error calculation circuit 9, is sent to the NOC 11. Meanwhile, this method of calculating the fine range fc error is the same as that explained in connection with the conventional technique.

The wide range fc error—CPE calculation circuit 10 calculates the carrier frequency error contained in the OFDM time domain signals following the digital quadrature demodulation by the digital quadrature demodulation circuit 6. Specifically, the wide range fc error—CPE calculation circuit 10 detects the wide range carrier frequency error to the precision of the sub-carrier frequency (such as 4.464 kHz). The wide range carrier frequency error as found by the wide range fc error—CPE calculation circuit 10 detects the CPE (common phase error) contained in the OFDM time domain signals to generate CPE correction signal used for correcting the CPE. The CPE correction signal, sp generated, is sent to the CPE cancellation circuit 13. The specified contents of the wide range fc error—CPE calculation circuit 10 will be explained in detail subsequently.

The NCO 11 sums the fine-range carrier frequency error, calculated to a precision not higher than ±½ of the sub-carrier frequency interval by the fine range fc error calculation circuit 9, to the wide range carrier frequency error, calculated by the wide range fc error—CPE calculation circuit 10, to the precision of the sub-carrier frequency interval, to output carrier frequency error correction signals, the frequency of which is increased or decreased depending on the carrier frequency error resulting from the calculations. The carrier frequency error correction signals are complex signals and are supplied to the fc correction circuit 7. The carrier frequency error correction signals are complex-multiplied with the OFDM time domain signals by the fc correction circuit 7, such that the carrier frequency error components of the OFDM time domain signals are eliminated.

Based on the OFDM symbol boundary position information, obtained when the fine range fc error calculation circuit 9 calculates the fine range carrier frequency error to the precision not higher than ±½ of the sub-carrier frequency interval, the FFT window synchronization circuit 12 finds the start timing of the FFT calculations by the FFT calculation circuit 8, to control the range of FFT calculation (FFT window).

The CPE cancellation circuit 13 complex-multiplies the CPE correction signal, calculated by the wide range fc error—CPE calculating circuit 10, with the OFDM frequency domain signals, to remove CPE (common phase error) contained in the OFDM frequency domain signals.

The equalizer 15 equalizes the phase and the amplitude of the OFDM frequency domain signals, using e.g., scattered pilot signals (SP signals). The OFDM frequency domain signals, equalized in phase and amplitude, are sent to the detection error correction circuit 16.

The detection error correction circuit 16 detects the information modulated in each sub-carrier in accordance with the modulation system and decodes the data by e.g., demapping. The detection error correction circuit 16 then corrects the decoded data for errors to output e.g., an MPEG-2 transport stream.

The transmission control information demodulating circuit 17 demodulates the transmission control information modulated in pre-set sub-carrier positions, such as TMCC (transmission and multiplexing configuration control) or TPS (transmission parameter signalling). The transmission control information demodulated is supplied to e.g., a system controller, not shown, so as to be used for controlling the demodulation or reproduction. The transmission control information demodulating circuit 17 also sends the transmission control information detection signal, indicating whether or not the transmission control information has been detected, to the holding circuit 14.

The wide range fc error—CPE calculation circuit 10 is hereinafter explained.

First, the principle of calculating the wide range carrier frequency error by the wide range fc error—CPE calculation circuit 10 is explained.

In the OFMD signals are contained pilot signals called the CP (continual pilot) signals. These CP signals are signals representing at all times the specified phase and amplitude and are inserted into the sub-carriers of plural indexes in the effective symbol. The number of the CP signals contained in the effective symbol and the arraying pattern of the inserting positions thereof are prescribed in a relevant standard. For example, the DVB-T standard (2K mode) provides that the CP signals are contained in 45 of 2048 sub-carriers (0 to 2047) present in one effective symbol. The index numbers of the specified sub-carriers, in which the CP signals are inserted, are as explained in connection with the prior-art example.

The present wide range fc error—CPE calculation circuit 10 converts the OFDM frequency domain signals, following the FFT calculations, into angular data, and executes differential demodulation twice between temporally forward and backward symbols of the angular data to extract CP signals. The wide range fc error—CPE calculation circuit 10 then calculates to which extent the sub-carrier positions of the extracted CP signals are shifted from the inherent sub-carrier positions to calculate the wide range carrier frequency error of the OFDM time domain signals.

The wide range fc error—CPE calculation circuit 10 converts the OFDM frequency domain signals following FFT calculations into angular data and performs difference detection once on the temporally forward and backward symbols of the angular data to calculate the CPE.

An illustrative circuit of the wide range fc error—CPE calculation circuit 10 is now explained.

Figure 10:
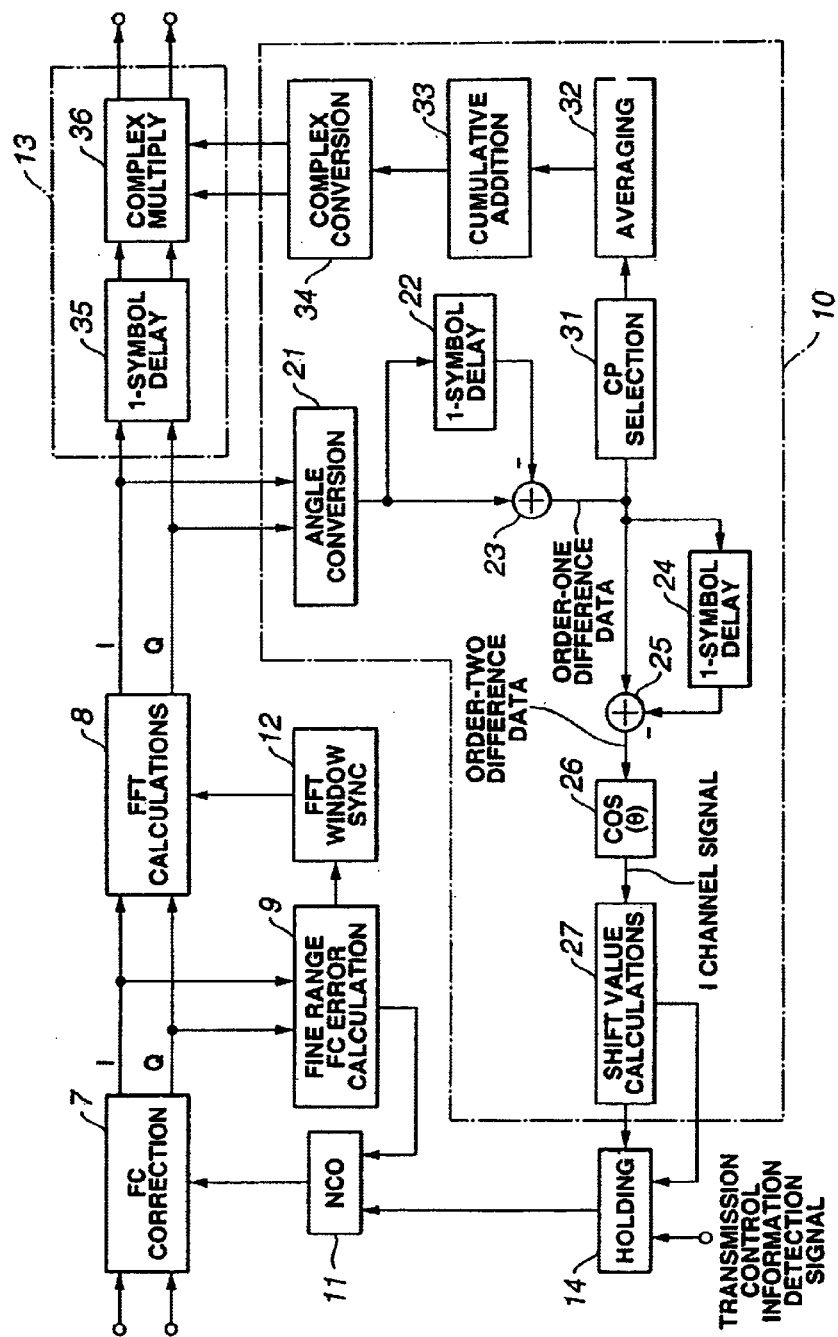
FIG. 10 is a block diagram showing essential portions of the OFDM reception apparatus shown in FIG. 9.

FIG. 10 shows a block diagram of the wide range fc error—CPE calculation circuit 10.

The wide range fc error—CPE calculation circuit 10 includes an angle conversion circuit 21, a first one-symbol delay circuit 22, a first subtraction circuit 23, a second one-symbol delay circuit 24, a first subtraction circuit 25, a cosine circuit 26, a shift value calculating circuit 27, a CP selection circuit 31, an averaging circuit 32, a cumulative addition circuit 33 and a complex calculation circuit 34.

The angle conversion circuit 21 is fed with OFDM frequency domain signals from the FFT calculation circuit 8. The angle conversion circuit 21 calculates an arctangent of the real-number and imaginary-number components of the OFDM frequency domain signals, supplied as complex signals, to convert the OFDM frequency domain signals into the angular data. The angular data, thus found, are supplied to the first one-symbol delay circuit 22 and to the first subtraction circuit 23.

The first one-symbol delay circuit 22 is formed by e.g., a FIFO and delays the OFDM frequency domain signals, rendered into angular data by the angle conversion circuit 21, by one symbol, to send the delayed signal to the first subtraction circuit 23. It is sufficient for the first one-symbol delay circuit 22 to have the memory capacity (2048 sample capacity) sufficient to hold one effective symbol of the angular data.

The first subtraction circuit 23 is made up e.g., of a simple addition circuit and executes differential calculations between angular data delayed one symbol and non-delayed angular data. If the symbol-to-symbol difference is taken of the angular data, of the routine information data, in which the angles between the different symbols are random, the angular values following the taking of the angular difference become random from data to data. Conversely, the CP signals are inherently signals of a constant phase, the inherent signal components are removed as a result of taking the angular difference once. Simultaneously, the FFT window phase error and the carrier phase error are removed. The information left on taking the symbol-to-symbol angular difference of the CP signals proves phase errors dependent on the carrier frequency error, on the CPE and on the replay clock frequency error.

The first subtraction circuit 23 send the calculated result to the second subtraction circuit 25, second one-symbol delay circuit 24 and to the CP selection circuit 31.

Similarly to the first one-symbol delay circuit 22, the second one-symbol delay circuit 24 is made up e.g., of an FIFO, and delays the first differential data supplied from the first subtraction circuit 23 by one symbol to send the delayed data to the second one-symbol delay circuit 24. Again, it is sufficient if this second one-symbol delay circuit 24 has a memory capacity to hold one effective symbol of the first differential data.

Similarly to the first subtraction circuit 23, the second subtraction circuit 25 is made up e.g., of a simple addition circuit, and effects differential calculations between the first differential data delayed by one symbol and the non-delayed first differential data. If the differential calculations are performed by the second subtraction circuit 25, symbol-to-symbol difference is, in effect, taken twice of the OFDM frequency domain signals rendered into the angular data. If the second symbol-to-symbol differential is taken of the angular data, the normal information data assume random angles between symbols, so that, as when the symbol-to-symbol differential is taken once, the angle becomes random between the symbols. Conversely, if the angle difference is taken of the CP signals twice, the phase errors dependent on the reproduction frequency error and the CPE are removed so that the carrier frequency error is left. Since the error left after the first angular difference calculations is the non-time-dependent information, the CP signals converge to a zero value.

The second subtraction circuit 25 send the result of the calculations to the cosine circuit 26 as the second difference data.

The cosine circuit 26 performs cosine calculations on the second different data supplied to convert the angular component to the real number component of the complex signal (I-channel signal). Thus, in the second difference data, converted to the I-channel signals, information data components are distributed at random on the I-axis, whereas the CP signal components are converged on a value 1 on the I-axis. The cosine circuit 26 sends the second difference data, converted into I-channel signals, to the shift value calculating circuit 27.

The shift value calculating circuit 27 extracts the CP signals from the second differential data supplied to calculate the sub-carrier positions of the CP signals to calculate to which extent the CP signals contained in the OFDM frequency domain signals are shifted from the sub-carrier positions in which the CP signals are inherently arrayed.

Figure 11:
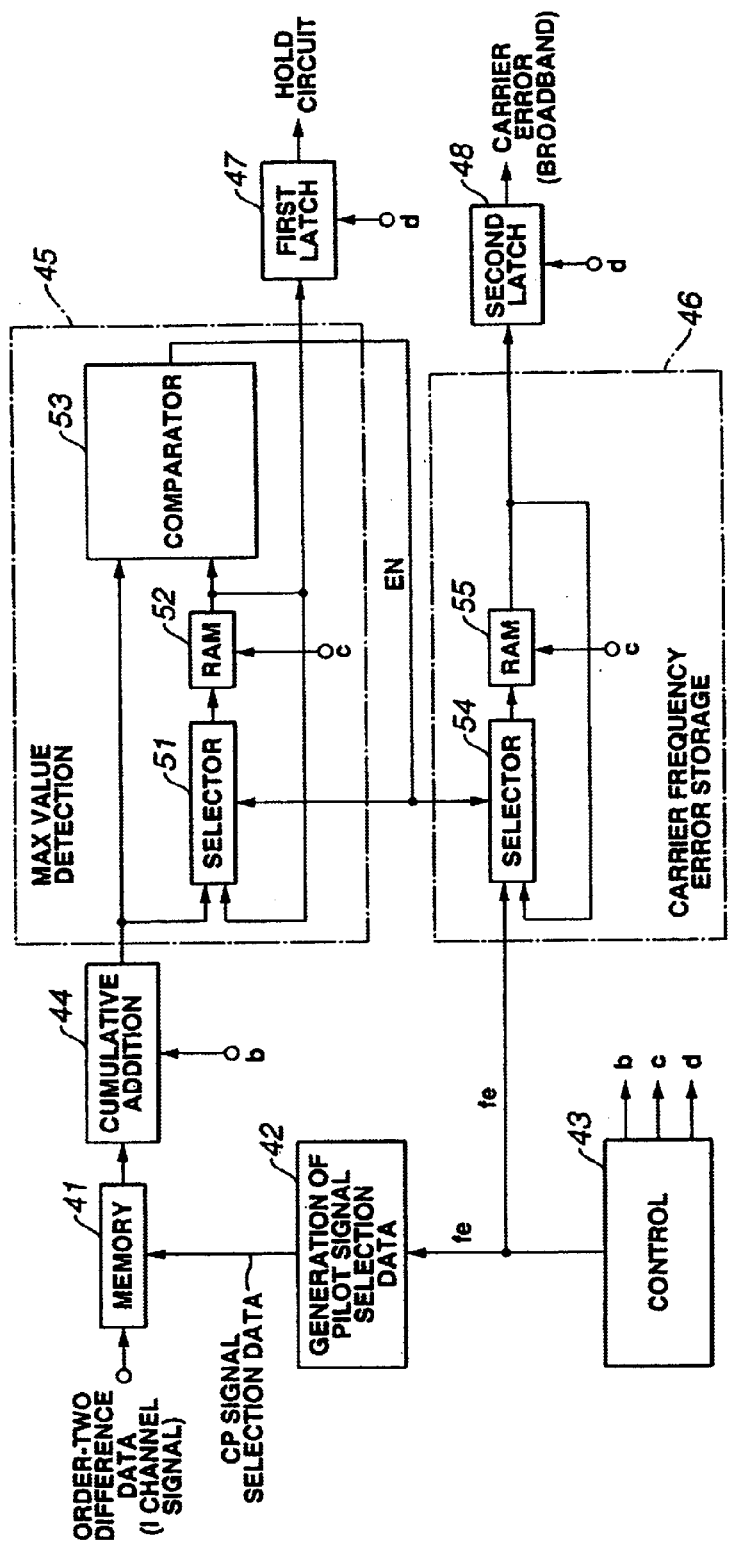
FIG. 11 is a block diagram of a shift value calculation circuit in the wide range fc error calculation circuit and CPE calculating circuit of the OFDM reception apparatus shown in FIG. 9.

FIG. 11 shows a typical circuit of the shift value calculating circuit 27.

Referring to FIG. 11, the shift value calculating circuit 27 includes a memory 41, a pilot signal selection data generating circuit 42, a control circuit 43, a cumulative addition circuit 44, a maximum value detection circuit 45, a carrier frequency error storage controller 46, a first latch circuit 47 and a second latch circuit 48.

The memory 41 holds one symbol of the second symbol-to-symbol differential data (I-channel signals), output from the cosine circuit 26, in the order of, for example, the sub-carrier index. The memory sends to the cumulative addition circuit 44 only the data stored therein and which has been specified by the readout address imparted from the pilot signal selection data generating circuit 42.

The pilot signal selection data generating circuit 42 generates the address information for specifying the CP (continual pilot) signals from the one-symbol equivalent of the second symbol-to-symbol differential data (I-channel signals) output from the cosine circuit 26. Specifically, the pilot signal selection data generating circuit 42 holds a set of index data specifying the arraying positions of the sub-carriers, such as 48 sub-carriers, in which the CP signals are modulated, from among the sub-carriers, such as 2048 sub-carriers, making up a sole effective symbol. This index data set is sent as the readout address for the memory 41. The data thus specified as the readout addresses are sent to the cumulative addition circuit 44. The data set specifying the index of the CP signals supplied as readout addresses for the memory 41 is termed CP signal selection data. This pilot signal selection data generating circuit 42 shifts the CP signal selection data depending on the shift value fe supplied from the control circuit 43, that is adds or subtracts a pre-set value unanimously to each value of the CP signal selection data, to impart the readout addresses several times to the memory 41 to read out the data plural times from the memory 41.

The CP signal selection data, generated from the pilot signal selection data generating circuit 42, may be that used in the prior-art example as explained with reference to FIGS. 7A to 7G.

21 patterns of the CP signal selection data, supplied as readout addresses to the memory 41, as shown for example in FIGS. 7A to 7G, are sequentially generated until updating of the second differential data stored in the memory 41. That is, during one symbol period, shift values of from −10Δf to 10Δf are sequentially supplied to the pilot signal selection data generating circuit 42, as a result of which 45 data corresponding to the respective shift values fe are sent sequentially supplied 21 times to the cumulative addition circuit 44.

The cumulative addition circuit 44 is fed with plural second differential data selected by the CP signal selection data so that these second differential data are cumulatively summed together. That is, the cumulative addition circuit 44 is reset in synchronism with the timing when the CP signal selection data is supplied to the memory 41. That is, if 21 patterns of the CP signal selection data shown in FIGS. 7A to 7G are supplied during one symbol period, the cumulative addition circuit 44 is reset each time the second differential demodulation data as selected for each pattern is supplied. Therefore, the cumulative addition circuit 44 sequentially outputs e.g., the 21 results of the cumulative addition one by one during each symbol period. The results output from the cumulative addition circuit 44 are sent to the maximum value detection circuit 45.

This maximum value detection circuit 45 includes a selector 51, a RAM 52 and a comparator circuit 53 and, of e.g., 21 results of the cumulative addition, output from the cumulative addition circuit 44, selects the maximum result of the cumulative addition, to output an enabling signal at a timing of selection of the maximum result of the cumulative addition. The maximum result of the cumulative addition indicates that the data read out from the memory 41 is the CP signals. That is, the CP signals are converged to a value of 1, while the other information data is of random values. Thus, if the CP signals only are extracted and added together cumulatively, the value of the cumulative addition is higher than the result of the cumulative addition of the other information data. This, the shift value of the CP signals may be obtained by selecting the maximum value of the cumulative addition.

Specifically, the comparator 53 compares the value stored in the RAM 52 to the result of the cumulative addition supplied from the cumulative addition circuit 44. If the result of the cumulative addition supplied from the cumulative addition circuit 44 is larger than the value stored in the RAM 52, the comparator outputs an enabling signal, which is sent to the selector 51. If fed with the enabling signal the selector causes the result of the cumulative addition to be stored in the RAM 52. Thus, of e.g., the 21 results of the cumulative addition, output from the cumulative addition circuit 44, the maximum result of the cumulative addition (result of the cumulative addition of the CP values) is stored in the RAM 52. On the other hand, the enabling signal output from the comparator circuit 53 when the maximum result of the cumulative addition of e.g., the 21 results of the cumulative addition is selected represents the last enabling signal occurrence timing (the last enabling signal occurrence timing in one symbol period). Meanwhile, the inner data in the RAM 52 in the maximum value detection circuit 45 is cleared each symbol period (at a timing of updating of the second differential demodulation data in the memory 41).

The maximum value of the result of the cumulative addition, stored in the RAM 52 (result of the cumulative addition of the CP values) is sent to the first latch circuit 47 and thence supplied to the holding circuit 14 at each one-symbol timing.

The carrier frequency error storage circuit 46 is made up of a selector 54, and a RAM 55 in which to store data as selected by the selector 54. The selector 54 is fed with the shift value fe, supplied from the control circuit 43 to the pilot signal selection data generating circuit 42, in timed relation to the supply thereof to the pilot signal selection data generating circuit 42. Simultaneously, an output of the RAM 55, connected on the downstream side, is fed back to the selector 54. The selector 54 operates in accordance with the enabling signal output from the comparator circuit 53 of the maximum value detection circuit 45. Specifically, the shift value fe supplied from the control circuit 43 is fed to the RAM 55 if the enabling signal is supplied, whereas, if the enabling signal is not supplied, the shift value fe fed back from the RAM 55 is stored in the RAM 55. Thus, the shift value fe of the CP signal selection data, which gives the maximum value of the result of the cumulative addition of the CP signals, is stored in the RAM 55.

The second latch circuit 48 latches the shift value fe stored in the RAM 55, at each symbol period, to output the value as the wide range carrier frequency error each sub-carrier interval.

The wide range fc error—CPE calculation circuit 10, described above, is able to extract plural CP signals contained in the effective symbol of the OFDM frequency domain signals resulting from the FFT calculations to calculate to which extent the sub-carrier position of the extracted CP signals are shifted from the inherent sub-carrier positions to render it possible to calculate the carrier frequency error of the OFDM signals to the accuracy of the sub-carrier interval.

Using the first symbol-to-symbol differential data (angular differential data) output from the first subtraction circuit 23, shown in FIG. 10, the wide range fc error—CPE calculation circuit 10 finds the CPE to generate CPE correction signals for cancelling the CPE contained in the OFDM signals.

The CP selection circuit 31 extracts the first differential data of the CP signal component from among the first symbol-to-symbol differential data supplied thereto. As aforesaid, a plurality of the CP signals are contained in pre-set positions of the plural sub-carriers in the effective symbol. The CP selection circuit 31 stores the indexes of the sub-carriers in which the CP signals are modulated and extracts only the index data to select the CP signals. The first symbol-to-symbol differential data of the CP signal component are sent to the averaging circuit 32.

The averaging circuit 32 averages the first symbol-to-symbol differential demodulation data of the CP signals within one symbol. The averaging circuit 32 finds an average value in one symbol of the first differential data of, for example, 45 CP signals, to output the average value as phase variation in the symbol. The value of this phase variation is routed to the cumulative addition circuit 33.

The cumulative addition circuit 33 cumulatively sums the phase variations (angular data) from symbol to symbol. By cumulatively summing the symbol-based phase variation components, it is possible to follow the phase variations of the OFDM signals. The angular data of the phase variation thus found is sent to the cumulative addition circuit 34.

The complex conversion circuit 34 converts the angular data into complex signals composed of real-number components (I-components) and the imaginary number components (Q-components). The phase variation values, converted into the complex signals, are sent as the CPE correction signals to the complex multiplication circuit 36 of the CPE cancellation circuit 13.

The OFDM frequency domain signals, output from the FFT calculation circuit 8, are delayed one symbol by the one-symbol delay circuit 35 of the CPE cancellation circuit 13 and thence supplied to the complex multiplication circuit 36 of the CPE cancellation circuit 13. The one symbol delay is here introduced because the processing is delayed by one symbol by the differential demodulation executed when the CPE calculating circuit 10 finds the CPE correction signal.

The complex multiplication circuit 36 complex-multiplies the OFDM frequency domain signals, delayed by one symbol, with the CPE correction signals sent from the complex calculation circuit 34 of the wide range fc error—CPE calculation circuit 10 to eliminate the CPE component contained in the OFDM frequency domain signals.

The wide range fc error—CPE calculation circuit 10 detects a first symbol-to-symbol difference of the OFDM frequency domain signals following the FFT calculations to calculate the CPE to generate CPE correction signals for eliminating the CPE to eliminate the CPE contained in the OFDM frequency domain signals.

The wide range fc error—CPE calculation circuit 10 thus converts the OFDM frequency domain signals, comprised of complex signals, into angular data, and subsequently finds the wide range fc error and the CPE correction signals. By conversion into angular data and subsequently finding the wide range fc error and the CPE correction signals, the capacity of the delay memory can be reduced in contradistinction from the prior art in which the wide range fc error or the CPE correction signals have to be found following conversion to angular data with the consequence that the two dimensional data have to be stored in the delay memory to perform differential demodulation of complex signals. Moreover, in the present wide range fc error—CPE calculation circuit 10, which handles angular data, the differential calculation circuit responsible for complex multiplication can be constructed using a simplified addition controlled thus simplifying the circuit configuration.

In the present wide range fc error—CPE calculation circuit 10, difference calculations are carried out twice on the OFDM frequency domain signals in finding the wide range fc error. These calculations may also be executed only once.

If the data modulated in each sub-carrier is modulated in accordance with the system such as BPSK or QPSK, a differential demodulation circuit is substituted for the one-symbol delay circuit 35 of the CPE cancellation circuit 13 shown in FIG. 10, while the cumulative addition circuit 33 and the equalizer 16 are both removed.

The holding circuit 14 is now explained.

The holding circuit 14 is fed from the shift value calculating circuit 27 in the wide range fc error—CPE calculation circuit 10 with the wide range fc error information, which is updated from symbol to symbol. The holding circuit 14 sends the updated wide range fc error information to the NCO 11.

The holding circuit 14, also verifies, based on the information indicating demodulation reliability, such as the transmission control signal detection information transmitted from the transmission control information demodulating circuit 17, or on the result of cumulative addition of the CP values, supplied from the shift value calculating circuit 27 of the wide range fc error—CPE calculation circuit 10, whether or not the wide range fc error—CPE calculation circuit 10 is in error in detection. If it is decided that the wide range fc error—CPE calculation circuit 10 is in error in detection, the holding circuit 14 outputs a wide range fc error output in the previous symbol, without updating the wide range fc error information.

In general, if the operation is proceeding with the stable demodulation state of the OFDM signals, variations in the carrier frequency error is extremely small, such that the wide range fc error is scarcely fluctuated. Thus, in the stable state, the output from the shift value calculating circuit 27 is of a constant value. On the other hand, the case in which the wide range fc error output from the shift value calculating circuit 27 is when the frequency lock operation in the initializing operation is going on, when the carrier frequency of the OFDM signals is changed really due to variations in the receiver state or when the real carrier frequency has not been detected due to e.g., the noise despite the fact that the carrier frequency is not varied.

In case the real carrier frequency has not been detected due to e.g., the noise despite the fact that the carrier frequency is not varied, that is if the-carrier frequency is being detected erroneously, correction of the carrier frequency error based on the mistaken detection information leads to a worsened reception state to render carrier frequency lock impossible.

Thus, if the wide range fc error information, supplied from the shift value calculating circuit 27, is fluctuated, the holding circuit 14 verifies whether or not the variation is real, that is, it checks for the variation as to its reliability. If the variation is found to be low in reliability, the holding circuit 14 performs the processing of holding the pre-fluctuation value, without updating the wide range fc error information. That is, the holding circuit 14 verifies whether the carrier frequency of the OFDM signals has really been fluctuated, or the carrier frequency error is being detected erroneously due to e.g., noise. If the holding circuit 14 has verified that the carrier frequency error is being detected erroneously, it performs the processing of not updating the value.

As the information for verifying the fluctuations as to reliability, the result of the cumulative addition in one symbol of the CP signals from the second difference taking or the result of reproduction of the transmission control information, such as TPS or TMCC, may be used for giving a decision.

The result of the cumulative addition in one symbol of the CP signals or the transmission control information, such as TPS or TMCC, can be used as the information used in verifying the reliability by the following reason:

In e.g., the DVB-T standard (2K mode), 45 CP signals are contained in one symbol. If the symbol-to-symbol difference taking or differential demodulation is performed twice on the CP signals and the real-number components (I-channel components) are cumulatively summed together in one symbol, the result of the cumulative addition is ideally 45°. That is, if the difference is taken twice, the angular component of the CP signals is converged to zero, so that the real-number component is converged to 1. If 45 of this value is cumulated, the result is the value 45.

The result of experiments representing the comparison of the result of the cumulative addition of two differential demodulation of the totality of the CP signals in one symbol and the result of the cumulative addition of 45 of the information data obtained on two differential demodulation of other than the CP signals are shown in FIG. 12, in which the C/N ratio is plotted on the abscissa.

Ideally, the result of the cumulative addition of the CP signals is 45 if the C/N ratio is high. However, the value is decreased by errors, if there are any. Nevertheless, if the noise is larger, but a C/N ratio is not excessively low, the result of the cumulative addition falls below a certain value, such as 20, only on extremely rare occasions.

Conversely, the result of the cumulative addition of information data other than the CP signals exceeds a certain pre-set value, such as 13, only on extremely rare occasions, irrespective of the magnitude of the C/N ratio.

Therefore, if a threshold value is set so as to be not higher than the minimum value obtained as the result of the cumulative addition of the CP signals and so as to be not lower than the maximum value obtained as the result of the cumulative addition of the information data, specifically, to a value not less than 13 and not larger than 20, and if the result of the cumulative addition verified to be the CP signals by the wide range fc error—CPE calculation circuit 10, that is the result of the cumulative addition of CP output from the shift value calculating circuit 27, is not higher than this threshold value, the detection currently proceeding may be decided to be in error.

On the other hand, there is contained crucial information necessary for data demodulation and decoding, such as modulation system, bandwidth or code rate for information data, in the transmission control information, such as-TPS or TMCC. So, the modulation system stronger against errors than the routine information data, such as DBPSK, is used, and the same information is transmitted over plural, such as 68 symbols, to impart modulation reliability to the transmission control information.

Therefore, the transmission control information, such as TPS or TMCC, can be reproduced even in case wherein the data is difficult to demodulate due to noise.

Thus, if this transmission information is demodulated, it may be decided that the carrier frequency error is set as approximately normally.

The holding circuit 14 may thus verify whether or not the wide range fc error—CPE calculation circuit 10 is not performing an erroneous detection operation, based on the information indicating the reliability in demodulation, such as the result of the cumulative addition of the CP signals or the transmission control information, such as TPS or TMCC.

Specifically, the holding circuit 14 performs the following processing, using the above-described transmission control information and results of cumulative addition of the PC signals.

When fed with the wide range fc error information from the shift value calculating circuit 27, the holding circuit 14 compares the wide range fc error information thus supplied to the wide range fc error information supplied in the previous symbol to verify whether or not the value has changed. If the result of decision indicates that the wide range fc error information supplied in the previous symbol differs from that of the current symbol, the holding circuit 14 then verifies whether or not the result of cumulative addition of the CP signals supplied from the shift value calculating circuit 27 is not larger than a pre-set threshold value. If the result of cumulative addition of the CP signals is not larger than the pre-set threshold value, the wide range fc error information supplied is not updated but the wide range fc error information supplied in the previous symbol is held and supplied to the NOC 11.

When fed with the wide range fc error information from the shift value calculating circuit 27, the holding circuit 14 compares the wide range fc error information thus supplied to the wide range fc error information supplied in the previous symbol to verify whether or not the value has changed. If the result of decision indicates that the wide range fc error information supplied in the previous symbol differs from that of the current symbol, the holding circuit 14 then verifies whether or not the transmission control signal detection information has been supplied, that is whether or not the transmission control information such as the TPS or TMCC has been detected. If the transmission control information is detected, the wide range fc error information supplied is not updated but the wide range fc error information supplied in the previous symbol is held and supplied to the NOC 11.

The holding circuit 14 verifies the reliability of the wide range fc error information supplied from the wide range fc error—CPE calculation circuit 10 and, if the information supplied is low in reliability, the holding circuit 14 holds the wide range fc error at a value of the previous symbol under the assumption that the wide range fc error—CPE calculation circuit 10 has made error in detection. Thus, if the correct carrier frequency error is difficult to detect due to noise of fading, the holding circuit 14 holds the synchronization of the carrier frequency correction control operation of the OFDM signals in stability to prevent the malfunction from occurring.

Although the present holding circuit 14 holds the wide range fc error information output from the wide range fc error—CPE calculation circuit 10, it is also possible for the holding circuit 14 to hold the information output by the fine range fc error—CPE calculation circuit 9.

Moreover, although the holding circuit 14 verifies, based on the cumulative addition value and the transmission control information, whether or not the carrier frequency is a errors in detection operation, an error correction value, for example, may also be used in making the decision.

What is claimed is:

1. A demodulating apparatus for demodulating orthogonal frequency division multiplexing (OFDM) signals, comprising:

carrier frequency correction means for complex-multiplying carrier frequency error correction signals with the OFDM signals to correct a carrier frequency of said OFDM signals;

Fourier transform means for Fourier transforming the OFDM signals whose carrier frequency has been corrected by said carrier frequency correction means, every symbol period, to demodulate information modulated in each sub-carrier to generate frequency domain signals;

carrier frequency error calculating means for calculating carrier frequency error of said OFDM signals based on said frequency domain signals demodulated by said Fourier transform means and/or on said OFDM signals whose carrier frequency is corrected by said carrier frequency correction means;

frequency error correction signal generating means for generating said frequency error correction signals based on the carrier frequency error calculated by said carrier frequency error calculating means; and holding means for finding reliability of fluctuations in said carrier frequency error calculated by said carrier frequency error calculating means when said reliability is found to be low based upon a comparison of a cumulative addition of a plurality of index pulses extracted from said carrier frequency and a predetermined threshold and said holding means outputs the carrier frequency error output from said carrier frequency error calculating means at a pre-fluctuation value without updating.

2. The demodulating apparatus according to claim 1 wherein pilot signals of the same phase component are quadrature-modulated in predetermined sub-carrier positions in a symbol in said OFDM signals;

said carrier frequency error calculating means detects said pilot signals from said frequency domain signals to calculate the carrier frequency error based on a value of fluctuations of said pilot signals; and wherein if, in case the carrier frequency error calculated by said carrier frequency error calculating means is fluctuated, the energy of said pilot signals detected by said carrier frequency error calculating means is lower than a pre-set threshold value, said holding means holds the carrier frequency error output from said carrier frequency error calculating means at a pre-fluctuation value.

3. The demodulating apparatus according to claim 1 wherein transmission control signals are quadrature-modulated in predetermined sub-carrier positions in said OFDM signals; and wherein if, in case the carrier frequency error calculated by said carrier frequency error calculating means is fluctuated, said transmission control signals are decoded as normally, said holding means holds the carrier frequency error output from said carrier frequency error calculating means at a pre-fluctuation value.

4. A demodulating method for demodulating orthogonal frequency division multiplexing (OFDM) signals, comprising the steps of:

Fourier transforming said OFDM signals every symbol period to demodulate information modulated in each sub-carrier to generate frequency domain signals;

calculating a carrier frequency error of said OFDM signals based on said frequency domain signals and/or said OFDM signals;

generating a carrier frequency error correction signal based on the calculated carrier frequency error of the OFDM signals;

complex-multiplying said carrier frequency error correction signal with said OFDM signals to correct a carrier frequency of said OFDM signals; and finding reliability of fluctuations in the calculated carrier frequency error in case such fluctuations occur; and outputting said carrier frequency error at a pre-fluctuation value without updating if said reliability is found to be low, based upon a comparison of a cumulative addition of a plurality of index pulses extracted from said carrier frequency and a predetermined threshold.

5. The demodulating method according to claim 4 wherein pilot signals of a same phase component are quadrature-modulated in predetermined sub-carrier positions in a symbol in said OFDM signals;

said pilot signals are detected from said frequency domain signals and/or said OFDM signals to calculate the carrier frequency error based on a value of fluctuations of said pilot signals; and wherein if, in case the calculated carrier frequency error is fluctuated, energy of said pilot signals detected from said OFDM signals is lower than a pre-set threshold value, said holding means holds the carrier frequency error at a pre-fluctuation value.

6. The demodulating method according to claim 4 wherein transmission control signals are quadrature-modulated in a predetermined sub carrier in said OFDM signals; and wherein if, in case the carrier frequency error calculated is fluctuated, said transmission control signals are decoded as normally, said carrier frequency error is held at the pre-fluctuation value.

* * * * *